US008900738B2

(12) United States Patent
Nakamura

(10) Patent No.: US 8,900,738 B2
(45) Date of Patent: Dec. 2, 2014

(54) NON-AQUEOUS ELECTROLYTE SECONDARY BATTERY

(75) Inventor: Tomoyuki Nakamura, Fukushima (JP)

(73) Assignee: Sony Corporation, Tokyo (JP)

( * ) Notice: Subject to any disclaimer, the term of this patent is extended or adjusted under 35 U.S.C. 154(b) by 325 days.

(21) Appl. No.: 12/396,212

(22) Filed: Mar. 2, 2009

(65) Prior Publication Data

US 2009/0226807 A1 Sep. 10, 2009

(30) Foreign Application Priority Data

Mar. 5, 2008 (JP) ................................. 2008-055507

(51) Int. Cl.
H01M 2/02 (2006.01)
H01M 2/16 (2006.01)
H01M 10/05 (2010.01)
H01M 10/056 (2010.01)
H01M 10/0569 (2010.01)
H01M 10/0525 (2010.01)

(52) U.S. Cl.
CPC .......... *H01M 2/1673* (2013.01); *H01M 2/0287* (2013.01); *H01M 2/1653* (2013.01); *H01M 2/168* (2013.01); *H01M 10/0569* (2013.01); *Y02E 60/122* (2013.01); *H01M 2/1686* (2013.01); *H01M 10/0525* (2013.01)
USPC ........... 429/144; 429/129; 429/142; 429/186; 429/247

(58) Field of Classification Search
USPC ........................... 429/186, 247, 129, 142, 144
See application file for complete search history.

(56) References Cited

U.S. PATENT DOCUMENTS

| 5,641,565 | A | | 6/1997 | Sogo |
|---|---|---|---|---|
| 5,811,205 | A | | 9/1998 | Andrieu et al. |
| 5,856,039 | A | * | 1/1999 | Takahashi ..................... 429/129 |
| 6,051,341 | A | * | 4/2000 | Terasaki ........................ 429/234 |
| 6,322,599 | B1 | | 11/2001 | Hamano et al. |
| 6,881,515 | B2 | | 4/2005 | Wensley |
| 2006/0141341 | A1 | * | 6/2006 | Nishino et al. .................. 429/62 |

FOREIGN PATENT DOCUMENTS

| JP | 2148576 | | 6/1990 |
|---|---|---|---|
| JP | 06223802 A | * | 8/1994 |
| JP | 09-259857 | | 10/1997 |
| JP | 10261395 | | 9/1998 |
| JP | 2952017 | | 7/1999 |
| JP | 11269290 A | * | 10/1999 |
| JP | 2001-043897 | | 2/2001 |
| JP | 3225864 | | 8/2001 |
| JP | 3236359 | | 9/2001 |
| JP | 2002-075445 | | 3/2002 |
| JP | 3305006 | | 5/2002 |
| JP | 2003-178804 | | 5/2003 |
| JP | 2004-087209 | | 3/2004 |
| JP | 3593345 | | 9/2004 |
| JP | 2005-032549 | | 3/2005 |

(Continued)

*Primary Examiner* — Gregg Cantelmo

(74) *Attorney, Agent, or Firm* — K&L Gates LLP

(57) ABSTRACT

A non-aqueous electrolyte secondary battery includes a positive electrode, a negative electrode, a separator disposed between the both electrodes, a non-aqueous electrolytic solution and an exterior member made of a laminate material and housing the positive electrode, the negative electrode, the separator and the non-aqueous electrolytic solution. A polymeric support exists between the separator and at least one of the positive electrode and the negative electrode. Also, the separator contains polyethylene as a main component and contains not more than 10% by mass of polypropylene.

15 Claims, 4 Drawing Sheets

(56) References Cited

FOREIGN PATENT DOCUMENTS

| JP | 2006-108113 | 4/2006 |
|---|---|---|
| JP | 2006-286517 | 10/2006 |
| JP | 2007-042387 | 2/2007 |
| JP | 2007-087958 | 4/2007 |
| JP | 2007-299724 | 11/2007 |
| JP | 2008-047400 | 2/2008 |

* cited by examiner

NON-AQUEOUS ELECTROLYTE SECONDARY BATTERY

CROSS REFERENCES TO RELATED APPLICATIONS

The present application claims priority to Japanese Patent Application JP 2008-055507 filed in the Japan Patent Office on Mar. 5, 2008, the entire contents of which being incorporated herein by reference.

BACKGROUND

The present disclosure relates to a non-aqueous electrolyte secondary battery and in more detail, to a non-aqueous electrolyte secondary battery which is excellent in heat resistance, liquid-holding properties and cycle characteristic.

In recent years, a number of portable electronic devices, for example, camcorders (video tape recorders), cellular phones and portable computers, each achieving a reduction in size and weight, have appeared. Following this, development of batteries, in particular, secondary batteries as a portable power source for such electronic devices has been actively conducted. Above all, lithium ion secondary batteries have attracted much attention as a device capable of realizing a high energy density.

Also, recently, more reduction in size and weight and thinning of a battery is being advanced by using a laminated film or the like in place of a metal-made battery can made of aluminum or iron as a battery exterior material.

On the other hand, in order to increase the energy density, it is necessary to charge a more amount of an active material which acts to a charge-discharge reaction. Following this, it is known that it is necessary to use an electrolytic solution in an amount sufficient for moving a lithium ion between a positive electrode and a negative electrode. When the amount of the electrolytic solution is not sufficient, and the electrolytic solution does not completely fulfill the surroundings of the active material, a portion which does not come into contact with the electrolytic solution does not react, and a sufficient battery capacity is not obtainable.

Furthermore, as the repetition of charge and discharge proceeds, the electrolytic solution is consumed between the positive electrode and the negative electrode. Thus, the discharge capacity of the battery is gradually lowered before the positive electrode and negative electrode active materials have reached deterioration, thereby causing a problem of a lowering of the cycle characteristic or the generation of an internal short circuit due to a shortage of the electrolytic solution.

In order to overcome such a problem, it is proposed that in a battery using a metal-made battery can, the cycle characteristic can be improved by controlling the volume of a non-aqueous electrolytic solution relative to the discharge capacity (see, for example, JP-A-2-148576).

On the other hand, in order to meet the foregoing requirement for realizing a high capacity of the battery, thinning of a separator is inevitable. However, the higher the capacity is, the larger the energy amount within the battery is. Therefore, at an abnormal time such as short circuit and overcharge, the possibility of more excessive generation of heat generation than before is large.

For that reason, several kinds of means for securing safety even at an abnormal time are applied to the battery, and one of them is a shutdown function of the separator. The shutdown function is a function in which when the temperature of the battery increases due to some factor, pores of the separator are clogged, and a battery reaction is stopped by inhibiting the movement of an ion, thereby suppressing the excessive heat generation.

Polyethylene has been frequently used for a separator of a lithium ion secondary battery because it is excellent in such a shutdown function. However, there may be the case where polyethylene is exposed to a temperature at which the shutdown function is revealed or higher. In that case, there was involved a problem that the separator causes heat shrinkage, and the exposed positive electrode and negative electrode come into contact with each other to generate an internal short circuit, thereby causing thermorunaway.

On the other hand, polypropylene is exemplified as a material having a high melting point and capable of suppressing the heat shrinkage until a higher temperature. However, inversely, the temperature at which the shutdown function is revealed becomes high.

Then, in order to solve these problems, a separator composed of a laminate of polyethylene and polypropylene is proposed (see, for example, JP-A-10-261395).

In the foregoing problems of the related art, different from the case of batteries using the foregoing metal-made battery can, it is hard to say that a lowering of the cycle characteristic or the generation of an internal short circuit due to a shortage of the electrolytic solution is sufficiently solved in a non-aqueous secondary battery using a laminated film.

That is, when damaged, the laminated film is easily broken as compared with firm metal-made cans, and liquid leakage from a broken portion thereof is easy to occur. Accordingly, there was involved a problem that when the amount of the electrolytic solution is increased for the purpose of increasing the cycle characteristic, the liquid leakage easily occurs.

On the other hand, in order that the revealment of a shutdown function of a separator and the suppression of heat shrinkage properties may be regulated or made compatible with each other, when a laminate of polyethylene and polypropylene is used, the separator itself becomes thick. Thus, there was involved a problem that the energy density of the battery is rather lowered.

In view of the foregoing problems of the related art, it is desirable to provide a non-aqueous electrolyte secondary battery which is excellent in heat resistance, resistance to liquid leakage and cycle characteristic.

SUMMARY

In an embodiment, by arranging a prescribed polymeric support and by using a separator in which polyethylene and polypropylene coexist in a prescribed ratio, accomplishment of the embodiment can be achieved.

That is, a non-aqueous electrolyte secondary battery according to an embodiment is a non-aqueous electrolyte secondary battery including a positive electrode, a negative electrode, a separator disposed between the both electrodes, a non-aqueous electrolytic solution and an exterior member made of a laminate material and housing the positive electrode, the negative electrode, the separator and the non-aqueous electrolytic solution, wherein a polymeric support exists between the separator and at least one of the positive electrode and the negative electrode; and the separator contains polyethylene as a main component and contains not more than 10% by mass of polypropylene.

Also, in the non-aqueous electrolyte secondary battery according to the embodiment, it is preferable that the non-aqueous electrolytic solution existing in the non-aqueous electrolyte secondary battery is from 0.14 to 0.35 g per cm3 of the volume of the non-aqueous electrolyte secondary battery.

According to the embodiment, since not only the prescribed polymeric support is arranged, but the separator in which polyethylene and polypropylene coexist in a prescribed ratio, a non-aqueous electrolyte secondary battery which is excellent in heat resistance, resistance to liquid leakage and cycle characteristic can be provided.

Additional features and advantages are described herein, and will be apparent from the following Detailed Description and the figures.

DETAILED DESCRIPTION

A non-aqueous electrolyte secondary battery according to an embodiment is hereunder described in detail.

Figure 1:
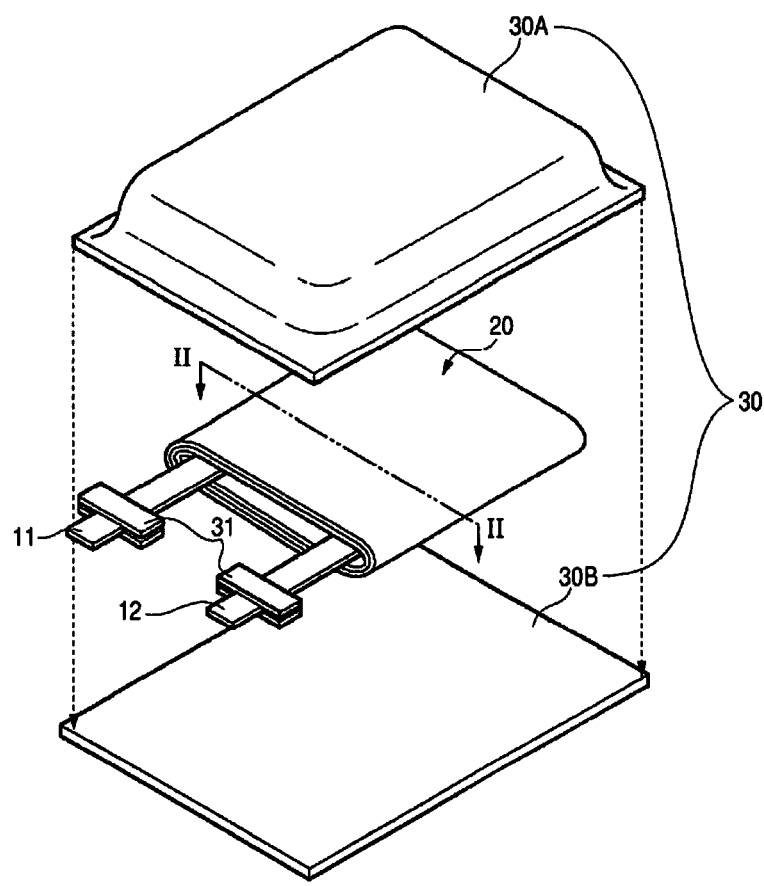
FIG. 1 is an exploded perspective view showing one example of a laminate type battery which is a non-aqueous electrolyte secondary battery according to an embodiment.

FIG. 1 is an exploded perspective view showing one example of a wound battery using a laminate material which is a non-aqueous electrolyte secondary battery according to an embodiment.

As shown in FIG. 1, this secondary battery is configured in such a manner that a wound battery element 20 having a positive electrode terminal 11 and a negative electrode terminal 12 installed therein is charged in the inside of an exterior member 30 (30A, 30B) in a film state. The positive electrode terminal 11 and the negative electrode terminal 12 are each derived in, for example, the same direction from the inside towards the outside of the exterior member 30. The positive electrode terminal 11 and the negative electrode terminal 12 are each constituted of a metal material, for example, aluminum (Al), copper (Cu), nickel (Ni) and stainless steel.

The exterior member 30 is constituted of a rectangular laminated film obtained by sticking, for example, a nylon film, an aluminum foil and a polyethylene film in this order. The exterior member 30 is, for example, provided in such a manner that the polyethylene film side and the battery element 20 are disposed opposing to each other, and respective external edges thereof are joined with each other by fusion or an adhesive.

An adhesive film 31 is inserted between the exterior member 30 and each of the positive electrode terminal 11 and the negative electrode terminal 12 for the purpose of preventing invasion of the outside air from occurring. The adhesive film 31 is constituted of a material having adhesiveness to the positive electrode terminal 11 and the negative electrode terminal 12, and for example, in the case where the positive electrode terminal 11 and the negative electrode terminal 12 are each constituted of the foregoing metal material, it is preferable that the adhesive film 31 is constituted of a polyolefin resin, for example, polyethylene, polypropylene, modified polyethylene and modified polypropylene.

The exterior member 30 may also be constituted of a laminated film having other structure, for example, a metal material-free laminated film, a polymer film, for example, polypropylene or a metal film in place of the foregoing laminated film.

Here, a general configuration of the exterior member can be expressed by a laminate structure of exterior layer/metal foil/sealant layer (however, the exterior layer and the sealant layer are sometimes configured of plural layers). In the foregoing example, the nylon film is corresponding to the exterior layer, the aluminum foil is corresponding to the metal foil, and the polyethylene film is corresponding to the sealant layer.

It is sufficient that the metal foil functions as a barrier membrane having water vapor permeation resistance. As the metal foil, not only the aluminum foil but a stainless steel foil, a nickel foil and a plated iron foil are useful. Of these, the aluminum foil which is lightweight and excellent in workability can be favorably used.

Examples of a mode of the configuration (exterior layer/metal foil/sealant layer) which can be used as the exterior member include Ny (nylon)/Al (aluminum)/CPP (cast polypropylene), PET (polyethylene terephthalate)/Al/CPP, PET/Al/PET/CPP, PET/Ny/Al/CPP, PET/Ny/Al/Ny/CPP, PET/Ny/Al/Ny/PE (polyethylene), Ny/PE/Al/LLDPE (linear low density polyethylene), PET/PE/Al/PET/LDPE (low density polyethylene) and PET/Ny/Al/LDPE/CPP.

Figure 2:
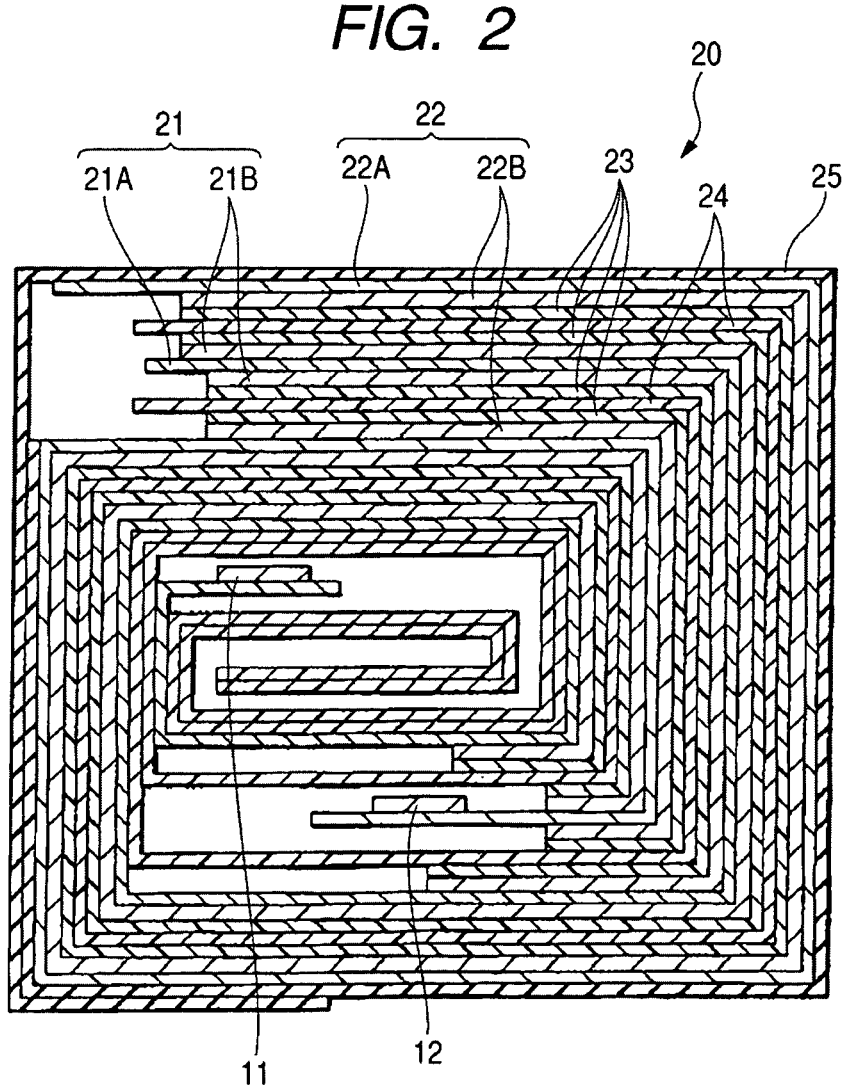
FIG. 2 is a schematic cross-sectional view of the battery element as shown in FIG. 1 along an II-II line thereof.

FIG. 2 is a schematic cross-sectional view showing the battery element 20 as shown in FIG. 1 along an II-II line thereof. In FIG. 2, the battery element 20 is one in which a positive electrode 21 and a negative electrode 22 are disposed opposing to each other and wound via a polymeric support (as described later) 23 which holds a non-aqueous electrolytic solution therein and a separator 24, and an outermost periphery thereof is protected by a protective tape 25.

Figure 3:
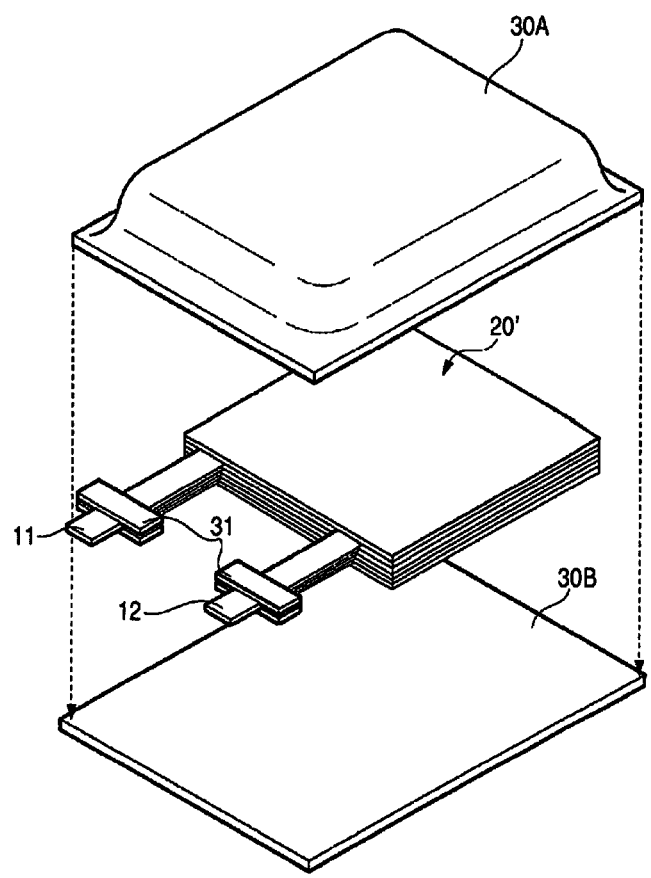
FIG. 3 is an exploded perspective view showing another example of a laminate type battery which is a non-aqueous electrolyte secondary battery according to another embodiment.

Here, FIG. 3 shows an exploded perspective view showing a non-aqueous electrolyte secondary battery according to another embodiment. That is, FIG. 3 is an exploded perspective view showing a laminate type battery using a laminate material which is a non-aqueous electrolyte secondary battery according to another embodiment. Members which are substantially the same as those in the foregoing wound secondary battery are given the same symbols, and descriptions thereof are omitted.

As shown in FIG. 3, this battery has the same configuration as in the wound battery as shown in FIG. 1, except that a laminated battery element 20' is provided in place of the foregoing wound battery element 20.

The laminated battery element 20' has a laminate structure in which a positive electrode and a negative electrode in a sheet form are disposed opposing to each other via the foregoing polymeric support which holds a non-aqueous electrolytic solution therein and a separator, and for example, the negative electrode sheet, the polymeric support layer, the separator, the polymeric support layer and the positive electrode sheet are laminated in this order.

In the embodiment as shown in FIG. 3, the laminated battery element 20' is one in which a negative electrode in a sheet form (negative electrode sheet) and a positive electrode in a sheet form (positive electrode sheet) are alternately laminated via a separator. Then, a polymeric support is further arranged between the positive electrode sheet and the separator and between the negative electrode sheet and the separator, respectively.

The laminated battery element 20' has a configuration substantially the same as in the wound battery as shown in FIG. 1 except for the foregoing point. Therefore, the description of the non-aqueous electrolyte secondary battery according to an embodiment is continued while again referring to the foregoing wound battery.

As shown in FIG. 2, the positive electrode 21 has, for example, a structure in which a positive electrode active material layer 21B is coated on one or both surfaces of a positive electrode collector 21A having a pair of opposing surfaces. The positive electrode collector 21A has a portion which is exposed without being coated with the positive electrode active material layer 21B in one end in the longitudinal direction thereof, and the positive electrode terminal 11 is installed in this exposed portion.

The positive electrode collector 21A is constituted of a metal foil, for example, an aluminum foil, a nickel foil and a stainless steel foil.

The positive electrode active material layer 21B contains, as a positive electrode active material, any one kind or two or more kinds of a positive electrode material capable of intercalating and deintercalating a lithium ion and may contain a conductive agent and a binder as the need arises.

Examples of the positive electrode material capable of intercalating and deintercalating lithium include lithium-free chalcogen compounds (especially, layered compounds and spinel type compounds), for example, sulfur (S), iron disulfide (FeS2), titanium disulfide (TiS2), molybdenum disulfide (MoS2), niobium diselenide (NbSe2), vanadium oxide (V2O5), titanium dioxide (TiO2) and manganese dioxide (MnO2); lithium-containing compounds containing lithium therein; and conductive polymer compounds, for example, polyaniline, polythiophene, polyacetylene and polypyrrole.

Of these, lithium-containing compounds are preferable because they include ones capable of obtaining high voltage and high energy density. Examples of such a lithium-containing compound include complex oxides containing lithium and a transition metal element; and phosphate compounds containing lithium and a transition metal. From the viewpoint of obtaining a higher voltage, those containing cobalt (Co), nickel (Ni), manganese (Mn), iron (Fe), copper (Cu), zinc (Zn), chromium (Cr), vanadium (V), titanium (Ti) or an arbitrary mixture thereof are preferable.

Such a lithium-containing compound is representatively represented by the following general formula (1) or (2):

$$\text{Li}_x\text{MIO}_2 \tag{1}$$

$$\text{Li}_y\text{MIIPO}_4 \tag{2}$$

In the foregoing formula, MI and MII each represents one or more kinds of a transition metal element; and values of x and y vary depending upon the charge-discharge state of the battery and are usually satisfied with $0.05 \le x \le 1.10$ and $0.05 \le y \le 1.10$, respectively.

The compound of the formula (1) generally has a layered structure; and the compound of the formula (2) generally has an olivine structure.

Also, specific examples of the complex oxide containing lithium and a transition metal element include a lithium cobalt complex oxide (LixCoO2), a lithium nickel complex oxide (LiXNiO2), lithium nickel cobalt complex oxide (LixNi1-zCozO2) (0<z<1)) and a lithium manganese complex oxide having a spinel structure (LiMn2O4).

Specific examples of the phosphate compound containing lithium and a transition metal element include a lithium iron phosphate compound having an olivine structure (LiFePO4) and a lithium iron manganese phosphate compound (LiFe1-vMnvPO4 (v<1)).

In these complex oxides, for the purpose of stabilizing the structure or the like, ones in which a part of the transition metal is substituted with Al, Mg or other transition metal element or contained in a crystal grain boundary and ones in which a part of oxygen is substituted with fluorine, etc, can be exemplified. Furthermore, at least a part of the surface of the positive electrode active material may be coated with other positive electrode active material. Also, a mixture of plural kinds of materials may be used as the positive electrode active material.

On the other hand, likewise the positive electrode 21, the negative electrode 22 has, for example, a structure in which a negative electrode active material layer 22B is provided on one or both surfaces of a negative electrode collector 22A having a pair of opposing surfaces. The negative electrode collector 22A has a portion which is exposed without being provided with the negative electrode active material layer 22B in one end in the longitudinal direction thereof, and the negative electrode terminal 12 is installed in this exposed portion.

The negative electrode collector 22A is constituted of a metal foil, for example, a copper foil, a nickel foil and a stainless steel foil.

The negative electrode active material layer 22B contains, as a negative electrode active material, any one kind or two or more kinds of a negative electrode material capable of intercalating and deintercalating a lithium ion and a metal lithium and may contain a conductive agent and a binder as the need arises.

Examples of the negative electrode material capable of intercalating and deintercalating lithium include carbon materials, metal oxides and polymer compounds. Examples of the carbon material include hardly graphitized carbon materials, artificial graphite materials and graphite based materials. More specific examples thereof include pyrolytic carbons, cokes, graphites, vitreous carbons, organic polymer compound burned materials, carbon fibers, active carbon and carbon black.

Of these, examples of the cokes include pitch coke, needle coke and petroleum coke. The organic polymer compound burned material as referred to herein is a material obtained through carbonization by burning a polymer material, for example, phenol resins and furan resins at an appropriate temperature. Also, examples of the metal oxide include iron oxide, ruthenium oxide and molybdenum oxide; and examples of the polymer compound include polyacetylene and polypyrrole.

Furthermore, examples of the negative material capable of intercalating and deintercalating lithium include materials containing, as a constitutional element, at least one of metal elements and semi-metal elements capable of forming an alloy together with lithium. This negative electrode material may be a single body, an alloy or a compound of a metal element or a semi-metal element. Also, one having a single kind or plural kinds of a phase in at least a part thereof may be used.

In an embodiment, the alloy also includes an alloy containing a single kind or plural kinds of a metal element and a single kind or plural kinds of a semi-metal element in addition to alloys composed of plural kinds of a metal element. Also, the alloy may contain a non-metal element. Examples of its texture include a solid solution, a eutectic (eutectic mixture), an intermetallic compound and one in which plural kinds thereof coexist.

Examples of the metal element or semi-metal element include tin (Sn), lead (Pb), aluminum (In), indium (In), silicon (Si), zinc (Zn), antimony (Sb), bismuth (Bi), gallium (Ga), germanium (Ge), arsenic (As), silver (Ag), hafnium (Hf), zirconium (Zr) and yttrium (Y).

Above all, a metal element or a semi-metal element belonging to the Group 14 of the long form of the periodic table is preferable; and silicon or tin is especially preferable. This is because silicon and tin have a large ability to intercalate and deintercalate lithium and are able to obtain a high energy density.

Examples of alloys of tin include alloys containing, as a second constitutional element other than tin, at least one member selected from the group consisting of silicon, magnesium (Mg), nickel, copper, iron, cobalt, manganese, zinc, indium, silver, titanium (Ti), germanium, bismuth, antimony and chromium (Cr).

Examples of alloys of silicon include alloys containing, as a second constitutional element other than silicon, at least one member selected from the group consisting of tin, magnesium, nickel, copper, iron, cobalt, manganese, zinc, indium, silver, titanium, germanium, bismuth, antimony and chromium.

Examples of compounds of tin or silicon include compounds containing oxygen (O) or carbon (C), and these compounds may contain the foregoing second constitutional element in addition to tin or silicon.

Next, the polymeric support layer 23 has ion conductivity and is able to hold a non-aqueous electrolytic solution therein. In the embodiment as shown in FIG. 2, this polymeric support layer 23 comes into close contact with or adheres to the separator 24. The polymeric support layer 23 may come into close contact with or adhere to the separator and the electrode as in the separator 24 and the positive electrode 21 or the separator 24 and the negative electrode 22. Alternatively, the polymeric support layer 23 may not come into close contact with or adhere to the separator but come into close contact with or adhere to either one or both of the positive electrode 21 and the negative electrode 22.

It is meant by the terms "close contact" as referred to herein that the polymeric support layer 23 comes into contact with the separator 24 or the positive electrode 21 or the negative electrode 22 closely to an extent that they do not relatively move each other unless a prescribed force is added.

When the polymeric support layer 23 and the separator 24, or the polymeric support layer 23 and the positive electrode or negative electrode come into close contact with or adhere to each other, the polymeric support layer 23 holds a non-aqueous electrolytic solution therein and becomes a gel non-aqueous electrolyte layer, whereby the positive electrode 21 or the negative electrode 22 and the separator 24 are adhered to each other via this non-aqueous electrolyte layer.

The degree of this adhesion is preferably a degree such that, for example, a peel strength between the separator and the exposed portion of the positive electrode 21 or the negative electrode 22 where the active material layer is not provided, but the collector is exposed is 5 mN/mm or more. The peel strength is an average value of the force required to peel the collector disposed on s stage from the separator while pulling at a rate of 10 cm/min in the 180° direction within a time period of from 6 seconds to 25 seconds after start of the pulling.

By such close contact or adhesion, in the non-aqueous electrolyte secondary battery according to an embodiment, an excess of the non-aqueous electrolytic solution which does not substantially contribute to a battery reaction can be reduced, and the non-aqueous electrolytic solution is efficiently supplied into the surroundings of the electrode active material. Accordingly, the non-aqueous electrolyte secondary battery according to an embodiment exhibits an excellent cycle characteristic even with a smaller amount of the non-aqueous electrolytic solution than that of the related art. Also, since the amount of the non-aqueous electrolytic solution to be used is small, the resistance to liquid leakage is excellent.

The polymeric support which constitutes the foregoing polymeric support layer is not particularly limited so far as it holds the non-aqueous electrolytic solution therein, thereby exhibiting ion conductivity. Examples thereof include acrylonitrile based polymers having a copolymerization amount of acrylonitrile of 50% by mass or more, and especially 80% by mass or more, aromatic polyamides, acrylonitrile/butadiene copolymers, acrylic polymers composed of an acrylate or methacrylate homopolymer or copolymer, acrylamide based polymers, fluorine-containing polymers of vinylidene fluoride, etc., polysulfones and polyarylsulfones. In particular, a polymer having a copolymerization amount of acrylonitrile of 50% by mass or more has a CN group in a side chain thereof, and thus, it has a high dielectric constant and is able to form a polymeric gel electrolyte with high ion conductivity.

In order to enhance the supporting properties of the non-aqueous electrolytic solution relative to such a polymer or enhance the ion conductivity of the polymeric gel electrolyte from such a polymer, copolymers obtained by copolymerizing acrylonitrile with a vinyl carboxylic acid (for example, acrylic acid, methacrylic acid and itaconic acid), acrylamide, methacrylsufonic acid, a hydroxyalkylene glycol (meth)acrylate, an alkoxyalkylene glycol (meth)acrylate, vinyl chloride, vinylidene chloride, vinyl acetate, a (meth)acrylate of every sort, etc. in a proportion of preferably not more than 50% by mass, and especially not more than 20% by mass can be used.

Also, the aromatic polyamide is a high heat-resistant polymer. Thus, when a polymeric gel electrolyte which is required to have high heat resistance as in automobile batteries is required, the aromatic polyamide is a preferred polymer compound. A polymer having a crosslinking structure which is obtained through copolymerization with butadiene, etc. can also be used.

In particular, polymers containing, as a constitutional component, vinylidene fluoride, namely homopolymers, copolymers and multi-component copolymers are preferable as the polymeric support. Specific examples thereof include polyvinylidene fluoride (PVdF), a polyvinylidene fluoride-hexafluoropropylene copolymer (PVdF-HFP) and a polyvinylidene fluoride-hexafluoropropylene-chlorotrifluoroethylene copolymer (PVdF-HEP-CTFE).

Next, the separator 24 is usually composed of an insulating thin membrane having high ion permeability and predetermined mechanical strength, such as a porous membrane composed of a polyolefin based resin or a porous membrane composed of an inorganic material such as a ceramic non-woven fabric, or the like. However, in the non-aqueous electrolyte secondary battery according to the present embodiment, the separator 24 is configured of a porous membrane containing polyethylene as a main component and containing not more than 10% by mass of polypropylene.

Here, in the separator in which polyethylene and polypropylene coexist, since a melting point of polypropylene is higher than that of polyethylene, the start temperature of heat shrinkage can be shifted to a higher temperature side. Inversely, since a shutdown function-revealing temperature of polypropylene is high, the battery temperature at the time of overcharge or internal short circuit is easy to become high, and therefore, thermorunaway is easily caused.

According to an embodiment, by making a mixing ratio of polyethylene and polypropylene fall within the foregoing range, the start temperature of heat shrinkage can be increased while keeping the shutdown function-revealing temperature low.

While the start temperature of heat shrinkage is low as compared with the case of 100% by mass of polypropylene, according to an embodiment, the separator and the electrode are firmly adhered to each other by the foregoing polymeric support, and therefore, it is possible to adequately control the heat shrinkage. Furthermore, according to such a structure where the polymeric support is arranged, since the separator itself can be made thin, the energy density of the battery can be kept high.

Also, as constitutional components of the foregoing separator, it is preferable to choose polyethylene having a melting point of from about 130 to 140° C. and polypropylene having a melting point of from about 160 to 170° C.

When a material having an excessively low melting point is contained as the constitutional component of the separator, a temperature at which the separator fuses is low so that the useful temperature becomes low. On the other hand, when a material having an excessively high melting point is contained as the constitutional component of the separator, a temperature at which the separator reveals the shutdown function is high so that thermorunaway is possibly caused, whereby there may be the case where it is difficult to secure the safety. Also, when there is a difference in melting point of 20° C. or more between the plural constitutional components, the functions including both shutdown and avoidance of the heat shrinkage can be sufficiently obtained.

A thickness of the separator is preferably from 5 to 20 μm.

Next, the non-aqueous electrolytic solution may be any solution containing an electrolyte salt and a non-aqueous solvent.

Here, the electrolyte salt may be any salt capable of generating an ion upon being dissolved or dispersed in a non-aqueous solvent as described later. Though lithium hexafluorophosphate (LiPF6) can be favorably used, the electrolyte salt is not limited thereto.

That is, inorganic lithium salts, for example, lithium tetrafluoroborate (LiBF4), lithium hexafluoroarsenate (LiAsF6), lithium hexafluoroantimonate (LiSbF6), lithium perchlorate (LiClO4) and lithium tetrachloroaluminate (LiAlCl4); lithium salts of a perfluoroalkanesulfonate derivative, for example, lithium trifluoromethanesulfonate (LiCF3SO3), lithium bis(trifluoromethanesulfone)imide (LiN(CF3SO2)2), lithium bis(pentafluoroethanesulfone)imide (LiN(C2F5SO2)2) and lithium tris(trifluoromethanesulfone)methide (LiC(CF3SO2)3) can be used. These salts can be used singly or in combination of two or more kinds thereof.

The content of such an electrolyte salt is preferably from 5 to 25% by mass. When the content of such an electrolyte salt is less than 5% by mass, there is a possibility that sufficient conductivity is not obtainable. On the other hand, when it exceeds 25% by mass, there is a possibility that the viscosity excessively increases.

Also, examples of the non-aqueous solvent include various high-dielectric solvents and low-viscosity solvents.

Ethylene carbonate or propylene carbonate or the like can be favorably used as the high-dielectric solvent, but the high-dielectric solvent is not limited thereto. Other examples of the high-dielectric solvent include cyclic carbonates, for example, butylene carbonate, vinylene carbonate, 4-fluoro-1,3-dioxolan-2-one (fluoroethylene carbonate), 4-chloro-1,3-dioxolan-2-one (chloroethylene carbonate) and trifluoromethylethylene carbonate.

Also, in place of or in addition to the cyclic carbonate, a lactone, for example, γ-butyrolactone and γ-valerolactone, a lactam, for example, N-methylpyrrolidone, a cyclic carbamic ester, for example, N-methyloxazolidinone, a sulfone compound, for example, tetramethylene sulfone or the like can be used as the high-dielectric solvent.

On the other hand, diethyl carbonate can be favorably used as the low-viscosity solvent. Besides, chain carbonates, for example, dimethyl carbonate, ethyl methyl carbonate and methyl propyl carbonate; chain carboxylic esters, for example, methyl acetate, ethyl acetate, methyl propionate, ethyl propionate, methyl butyrate, methyl isobutyrate, methyl trimethylacetate and ethyl trimethylacetate; chain amides, for example, N,N-dimethylacetamide; chain carbamic esters, for example, methyl N,N-diethylcarbamate and ethyl N,N-diethylcarbamate; and ethers, for example, 1,2-dimethoxyethane, tetrahydrofuran, tetrahydropyran and 1,3-dioxolane.

As the non-aqueous electrolytic solution to be used in the non-aqueous electrolyte secondary battery according to an embodiment, the foregoing high-dielectric solvent and low-viscosity solvent can be used singly or in admixture of two or more kinds thereof at any desired mixing ratio. Preferably, the non-aqueous electrolytic solution contains from 20 to 50% by mass of a cyclic carbonate and from 50 to 80% by mass of a low-viscosity solvent (low-viscosity non-aqueous solvent). In particular, a chain carbonate having a boiling point of not higher than 130° C. is desirably used as the low-viscosity solvent. By using such a non-aqueous electrolytic solution, the polymeric support can be favorably swollen with a small amount of the non-aqueous electrolytic solution, and it is possible to devise to make both suppression of swelling or prevention of the leakage of the battery and high conductivity much more compatible with each other.

When the ratio of the cyclic carbonate to the low-viscosity solvent falls outside the foregoing range, there is a possibility that the conductivity of the electrolytic solution is lowered, and the cycle characteristic is lowered.

Examples of the chain carbonate having a boiling point of not higher than 130° C. include dimethyl carbonate, ethyl methyl carbonate and diethyl carbonate.

Also, what a halogen atom-containing cyclic carbonic ester derivative is contained as the foregoing cyclic carbonate in the non-aqueous electrolytic solution is more preferable because the cyclic characteristic is improved.

Examples of such a cyclic carbonic ester derivative include 4-fluoro-1,3-dioxolan-2-one and 4-chloro-1,3-dioxolan-2-one. These cyclic carbonic ester derivatives can be used singly or in combination.

The content of the cyclic carbonic ester derivative is preferably from 0.5 to 2% by mass. When the content of the cyclic carbonic ester derivative is too low, an effect for enhancing the cyclic characteristic is small, whereas when it is too high, there is a possibility that swelling at the time of high-temperature storage becomes large.

According to an embodiment, since the amount of the non-aqueous electrolytic solution existing between the polymeric support layer and the separator, the positive electrode or the negative electrode without being supported by any of them is low, even when the low-viscosity solvent having a low boiling point is used in an amount of 50% by mass or more is used, the swelling is suppressed on a low level.

In the non-aqueous electrolyte secondary battery according to an embodiment as described previously, the non-aqueous electrolytic solution existing within the battery, typically the pouring amount of the non-aqueous electrolytic solution is preferably from 0.14 to 0.35 g per cm3 of the volume of this non-aqueous electrolyte secondary battery.

When the pouring amount of the non-aqueous electrolytic solution is less than 0.14 g per cm3 of the volume of the battery, there is a possibility that expected battery performances, specifically expected initial charge-discharge capacity and capacity retention rate cannot be realized, whereby when it exceeds 0.35 g, there is a possibility that the resistance to liquid leakage is lowered.

Here, the pouring amount within the battery is, for example, measured by a method as described below.

First of all, a weight of the battery is measured; and subsequently, the battery element is taken out and then disassembled into the positive electrode, the negative electrode and the separator. Thereafter, the positive electrode, the negative electrode, the separator and the exterior member are immersed in a dimethyl carbonate solution for 2 days; and after filtration, vacuum drying is carried out for 3 days. A value obtained by subtracting the weight after vacuum drying from the initial weight is defined as the pouring amount.

Also, in the non-aqueous electrolyte secondary battery according to the present embodiment, it is preferable that a ratio (MO/MA) of the amount MO of the non-aqueous electrolytic solution existing between the battery element 20 and the exterior member 30 to the amount MA of the non-aqueous electrolytic solution existing inside the exterior member 30 is not more than 0.04.

When the thus defined MO/MA exceeds 0.04, there is a possibility that swelling of the battery at the time of high-temperature storage cannot be sufficiently suppressed. Also, it is preferable that the MO/MA value is small as far as possible. Most desirably, the MO/MA value is 0. However, even when it is not more than 0.03, a more remarkable effect for suppressing swelling can be obtained.

Here, the amount MA of the non-aqueous electrolytic solution existing inside the exterior member, namely within the non-aqueous electrolyte secondary battery may be, for example, measured and calculated in the following method.

First of all, a mass of the battery is measured; and subsequently, the battery element is taken out and then disassembled into the positive electrode, the negative electrode and the separator. Next, the positive electrode, the negative electrode, the separator and the exterior member are immersed in a rinse liquid such as dimethyl carbonate for 2 days; and after filtration, vacuum drying is carried out for 3 days. Thereafter, a mass of the battery after vacuum drying is measured, and the mass of the battery after vacuum drying is subtracted from the initial mass of the battery, thereby determining MA.

On the other hand, the amount MO of the non-aqueous electrolytic solution existing between the battery element and the exterior member, namely existing within the battery and outside the battery element may be, for example, measured and calculated in the following method.

First of all, a mass of the battery is measured, and the battery element is then taken out. Subsequently, the thus taken out battery element is interposed by a raw material capable of absorbing the non-aqueous electrolytic solution therein, for example, cloths, and all of the non-aqueous electrolytic solutions which have oozed out upon application of a load of 10 kPa are wiped off. Also, the exterior member from which the battery element has been taken out is immersed in a rinse liquid such as dimethyl carbonate and then dried. Thereafter, a total mass of the exterior member and the battery element having been subjected to a wiping-off treatment is measured, and the total mass of the exterior body and the electrode body after the wiping-off treatment is subtracted from the initial mass of the battery, thereby determining MO.

Next, one example of the manufacturing method of the foregoing secondary battery is described.

The foregoing laminate type secondary battery can be manufactured in the following manner.

First of all, the positive electrode 21 is prepared. For example, in case of using a granular positive electrode active material, a positive electrode active material and optionally, a conductive agent and a binder are mixed to prepare a positive electrode mixture, which is then dispersed in a dispersion medium, for example, N-methyl-2-pyrrolidone to prepare a positive electrode mixture slurry.

Subsequently, this positive electrode mixture slurry is coated on the positive electrode collector 21A and dried, and then compression molded to form the positive electrode active material layer 21B.

Also, the negative electrode 22 is prepared. For example, in case of using a granular negative electrode active material, a negative electrode active material and optionally, a conductive agent and a binder are mixed to prepare a negative electrode mixture, which is then dispersed in a dispersion medium such as N-methyl-2-pyrrolidone to prepare a negative electrode mixture slurry. Thereafter, this negative electrode mixture slurry is coated on the negative electrode collector 22A and dried, and then compression molded to form the negative electrode active material layer 22B.

The polymeric support layer 23 is then formed on the separator 24. Examples of the technique for forming the polymeric support layer 23 on the separator 24 include a technique of coating a polymeric support-containing solution on the surface of the separator 24 and removing the solvent; and a technique of affixing a separately prepared polymeric support layer on the surface of the separator 24.

Examples of the technique for coating the polymeric support-containing solution on the surface of the separator 24 include a technique of immersing the separator in the polymeric support-containing solution; a technique of supplying and coating the solution by means of a T-die extrusion method or the like; and a technique of coating the solution on the surface of a base material by a spraying method or with a roll coater, a knife coater, or the like.

Examples of the technique of a desolvation treatment for removing the solvent include a technique of removing the solvent by drying; a technique of immersing the coated layer in a poor solvent of the polymeric support to remove the solvent by extraction and then drying and removing the poor solvent; and a combination of these techniques.

As the technique of affixing the separately prepared polymeric support layer to the surface of the separator 24, the adhesion can be achieved by using an adhesive. In that case, however, the adhesive may be adequately chosen according to the type of the electrolytic solution to be used (for example, an acid, an alkali and an organic solvent), and attention may be paid not so as to generate clogging.

Examples of technique for allowing the polymeric support layer to come into close contact with the separator include heat fusion at a temperature of the gel transition point or higher. In particular, heat fusion while applying a pressure, for example, hot roll compression is preferable.

Subsequently, the positive electrode terminal 11 is installed in the positive electrode 21, and the negative electrode terminal 12 is also installed in the negative electrode 22. Thereafter, the separator 24 provided with the polymeric support layer 23, the positive electrode 21, another separator 24 of the same type and the negative electrode 22 are successively laminated and wound. The protective tape 25 is adhered onto the outermost peripheral portion to form a wound electrode body. Furthermore, the wound electrode body is interposed between the exterior members 30 (30A and 30B), and the peripheral portions thereof are heat fused with each other except for one side, thereby forming a bag.

Thereafter, an electrolyte salt such as lithium hexafluorophosphate and a non-aqueous electrolytic solution containing a non-aqueous solvent such as ethylene carbonate are prepared and poured into the inside of the wound electrode body from an opening of the exterior member 30. The opening of the exterior member 30 is heat fused to achieve hermetic sealing. According to this, the non-aqueous electrolytic solution is held by the polymeric support layer 23, thereby completing the secondary battery as shown in FIGS. 1 and 2.

In the technique of swelling the electrolytic solution to form an electrolyte after the polymeric support layer is formed and contained, a precursor which is a raw material for forming the polymeric support and the solvent can be removed in advance so that such a material or solvent does not remain within the electrolyte. Furthermore, the process of forming the polymeric support can be favorably controlled. For that reason, it is possible to make the polymeric support layer come into close contact with the separator, the positive electrode and/or the negative electrode.

In the secondary battery as described previously, when charged, a lithium ion is deintercalated from the positive electrode active material layer 21B and intercalated in the negative electrode active material layer 22B via the non-aqueous electrolytic solution held in the polymeric support layer 23. When discharged, a lithium ion is deintercalated from the negative electrode active material layer 22B and intercalated in the positive electrode active material layer 21B via the polymeric support layer 23 and the non-aqueous electrolytic solution.

EXAMPLES

An embodiment is hereunder described in more detail with reference to the following Examples and Comparative Examples while referring to the accompanying drawings. However, it should not be construed that the present invention is limited thereto.

Example 1-1

Cobalt carbonate (CoCO3) was mixed in a proportion of 1 mole per 0.5 moles of lithium carbonate (Li2CO3), and the mixture was burned in air at 900° C. for 5 hours, thereby obtaining a lithium cobalt complex oxide (LiCoO2) as a positive electrode active material.

Subsequently, 85 parts by mass of the obtained lithium cobalt complex oxide, 5 parts by mass of graphite as a conductive agent and 10 parts by mass of polyvinylidene fluoride as a binder were mixed to prepare a positive electrode mixture, which was then dispersed in N-methyl-2-pyrrolidone as a dispersion medium to form a positive electrode mixture slurry. Subsequently, this positive electrode mixture slurry was uniformly coated on the both surfaces of the positive electrode collector 21A composed of an aluminum foil and having a thickness of 20 μm, dried and then compression molded by a roll press to form the positive electrode active material layer 21B. There was thus prepared the positive electrode 21. Thereafter, the positive electrode terminal 11 was installed in the positive electrode 21.

On the other hand, a pulverized graphite powder was prepared as a negative electrode active material. 90 parts by mass of this graphite powder and 10 parts by mass of polyvinylidene fluoride as a binder were mixed to prepare a negative electrode mixture, which was then dispersed in N-methyl-2-pyrrolidone as a dispersion medium to form a negative electrode mixture slurry.

Subsequently, this negative electrode mixture slurry was uniformly coated on the both surfaces of the negative electrode collector 22A composed of a copper foil and having a thickness of 15 μm, dried and then compression molded by a roll press to form the negative electrode active material layer 22B. There was thus prepared the negative electrode 22. Subsequently, the negative electrode terminal 12 was installed in the negative electrode 22.

Also, polyvinylidene fluoride was used as a polymer compound to be used for the polymeric support layer 23. A solution of the subject polymer prepared by dissolving it in an N-methyl-2-pyrrolidone solution in an amount of 12 parts by mass was coated on the both surface of the separator 24 composed of a microporous film and having a thickness of 12 μm by a coating unit. On that occasion, a ratio of polyethylene (melting point: 135° C.) and polypropylene (melting point: 165° C.) as materials of the separator was changed as shown in Table 1.

This coated film was immersed in deionized water and then dried to form the polymeric support layer 23 having a thickness of 5 μm on the separator 24.

The quantitative determination of the composition of the used separator was carried out in the following manner.

<Measurement Condition>
  Apparatus: Bruker's nuclear magnetic resonance apparatus, AVANCE II 400 (equipped with a 4-mm MAS probe)
  Temperature: Room temperature
  Measurement nucleus: 13C
  Measurement method: CPMAS method (cross-polarization magic angle spinning method)
  Contact time: 0.4 ms
  Rotation rate of sample: 10 kHz
  Standard material: 1M-LiCl aq
<Measurement Method>

Figure 4:
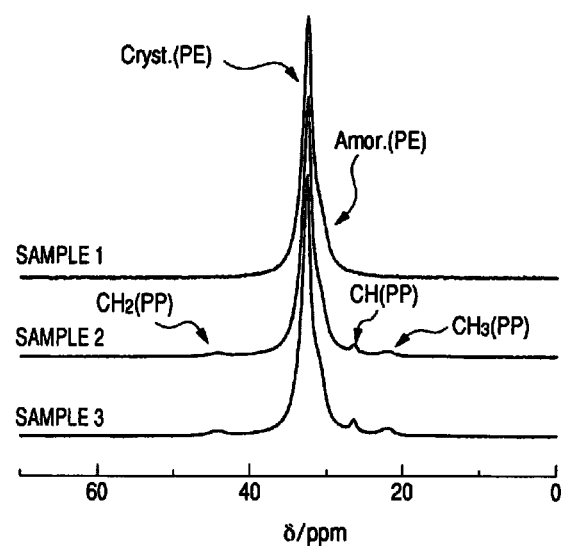
FIG. 4 is an NMR chart used for the quantitative determination of separator components.

A standard sample of PP/PE=1/1 (molar number ratio of monomers) was subjected to 13C CPMAS NMR spectral measurement at a rotation rate of the sample of 10 kHz for a contact time of 0.4 ms, thereby estimating a difference in magnetization transfer efficiency of the respective components. By determining a coefficient for correcting it, an actual sample measured under the same condition was quantitatively determined. With respect to the obtained NMR spectra, an area ratio of each component was adopted as a composition ratio (see FIG. 4).

The thus prepared positive electrode 21 and negative electrode 22 were brought into close contact with each other via the separator 24 having the polymeric support layer 23 formed thereon and wound in the longitudinal direction. The protective tape 25 was stuck on the outermost periphery to prepare the wound battery element 20.

Furthermore, the prepared battery element 20 was interposed by the exterior members 30A and 30B, and three sides thereof were heat fused. A moisture-resistant aluminum laminated film prepared by laminating a 25 μm-thick nylon film, a 40 μm-thick aluminum foil and a 30 μm-thick polypropylene film in this order from the outermost layer was used as the exterior member 30 (30A, 30B).

Subsequently, an electrolytic solution was poured into the exterior member 30 having the battery element 20 contained therein, and the remaining one side of the exterior member 30 was heat fused under a reduced pressure, thereby achieving hermetic sealing. On that occasion, the remaining one side of the exterior member 30 was heat fused and hermetically sealed so as to have a prescribed amount of the electrolytic solution as shown in Table 1 (weight of the electrolytic solution within the cell) relative to the cell volume as an inner volume of the exterior member 30.

An electrolytic solution prepared by dissolving 1.2 moles/L of lithium hexafluorophosphate in a mixed solvent of ethylene carbonate and diethylene carbonate in a mass ratio of ethylene carbonate to diethylene carbonate of 3/7 was used as the electrolytic solution.

Thereafter, the obtained sealed body was interposed by iron plates and heated at 70° C. for 3 minutes, thereby adhering the separator 24 to each of the positive electrode 21 and the negative electrode 22 via the polymeric support layer 23. There was thus obtained a non-aqueous electrolyte secondary battery of this Example having a size of 5 mm in thickness×30 mm in width×40 mm in height (6 cm3) as shown in FIGS. 1 and 2.

Examples 1-2 to 1-6

Non-aqueous electrolyte secondary batteries of these Examples were each obtained by repeating the same operations as in Example 1, except for regulating the composition of the separator material as shown in Table 1.

Comparative Examples 1-1 to 1-5

Non-aqueous electrolyte secondary batteries of these Comparative Examples were each obtained by repeating the same operations as in Example 1, except for regulating the composition of the separator material as shown in Table 1.

Comparative Example 1-6

A non-aqueous electrolyte secondary batter of this Comparative Example was obtained by repeating the same operations as in Example 1, except for not forming the polymeric support.

<Initial Discharge Capacity>

Each of the secondary batteries of Examples 1-1 to 1-6 and Comparative Examples 1-1 to 1-6 was subjected to constant-current constant-voltage charge at 23° C. and 200 mA for 7 hours until it reached an upper limit of 4.2 V and then subjected to constant-current discharge at 100 mA until it reached a final voltage of 2.5 V, thereby determining an initial discharge capacity. The obtained results are shown in Table 1.

<Safety Test by Nail Piercing>

Each of the secondary batteries of Examples 1-1 to 1-6 and Comparative Examples 1-1 to 1-6 was charged to 4.25 V; and thereafter, a barrel of the battery was pieced and penetrated by a nail having a diameter of 2.5 mm at a rate of 100 mm/sec in the state of keeping the battery temperature at 25° C., thereby measuring a maximum attained temperature of the battery. The obtained results are shown in Table 1.

<Measurement of Weight of Electrolytic Solution in Battery>

Each of the secondary batteries of Examples 1-1 to 1-6 and Comparative Examples 1-1 to 1-6 was measured for a weight of the electrolytic solution in the battery.

That is, with respect to each secondary battery, after measuring a weight of the battery, the battery element is taken out and then disassembled into the positive electrode, the negative electrode and the separator. Thereafter, the positive electrode, the negative electrode, the separator and the exterior member are immersed in a dimethyl carbonate solution for 2 days; and after filtration, vacuum drying is carried out for 3 days. The weight of the electrolytic solution was obtained by subtracting the weight after vacuum drying from the initial weight. The obtained results are shown in Table 1.

TABLE 1

| | Presence or absence of polymeric support | Composition of separator material | | Initial discharge capacity (mAh) | Maximum attained temperature (° C.) | Amount of electrolytic solution (g) |
| --- | --- | --- | --- | --- | --- | --- |
| | | Polyethylene (%) | Polypropylene (%) | | | |
| Example 1-1 | Yes | 95 | 5 | 852 | 64 | 1.6 |
| Example 1-2 | Yes | 99.5 | 0.5 | 854 | 98 | 1.6 |
| Example 1-3 | Yes | 99 | 1 | 852 | 85 | 1.6 |
| Example 1-4 | Yes | 97 | 3 | 851 | 68 | 1.6 |
| Example 1-5 | Yes | 92 | 8 | 853 | 88 | 1.6 |
| Example 1-6 | Yes | 90 | 10 | 855 | 96 | 1.6 |
| Comparative Example 1-1 | Yes | 100 | 0 | 848 | Thermorunaway | 1.6 |
| Comparative Example 1-2 | Yes | 85 | 15 | 853 | 121 | 1.6 |
| Comparative Example 1-3 | Yes | 50 | 50 | 855 | Thermorunaway | 1.6 |
| Comparative Example 1-4 | Yes | 20 | 80 | 852 | Thermorunaway | 1.6 |
| Comparative Example 1-5 | Yes | 0 | 100 | 850 | Thermorunaway | 1.6 |
| Comparative Example 1-6 | No | 95 | 5 | 851 | Thermorunaway | 1.6 |

As shown in Table 1, with respect to the batteries of Examples 1-1 to 1-6, the surface maximum attained temperature at the time of conducting the safety test by nail piercing was low as not higher than 100° C. On the other hand, with respect to the batteries of Comparative Examples 1-1 to 1-6, the surface maximum attained temperature exceeded 100° C., or thermorunaway was caused.

With respect to the battery of Comparative Example 1-1, it may be thought that since the proportion of polyethylene was 100%, though the shutdown function worked, the temperature reached the start temperature of heat shrinkage of the separator, and an internal short circuit was generated, leading to thermorunaway. With respect to the batteries of Comparative Examples 1-3 to 1-5, it may be thought that since shutdown did not occur, thermorunaway was caused. With respect to the battery of Comparative Example 1-2, it may be thought that since the shutdown temperature was high, the temperature reached a high temperature. With respect to the battery of Comparative Example 1-6, it may be thought that since the polymeric support was not formed, adhesion between the electrode and the separator did not occur, and the separator was easy to cause heat shrinkage.

It was noted from the foregoing fact that when not only the polymeric support is disposed between the separator and at least one of the positive electrode and the negative electrode, but the separator contains polyethylene as a main component and contains not more than 10% by mass of polypropylene, a battery in which heat shrinkage of the separator is suppressed and which has high heat resistance and high safety is obtained.

Examples 2-1 and 2-2

Secondary batteries of these Examples were each prepared by repeating the same operations as in Example 1-1, except for changing the pouring amount so as to have the amount of electrolytic solution as shown in Table 2.

Example 2-3

A secondary battery of this Example was prepared by repeating the same operations as in Example 1-1, except for changing the pouring amount so as to have the amount of electrolytic solution as shown in Table 2 and not conducting heating after pouring the electrolytic solution.

Comparative Examples 2-1 to 2-3

Secondary batteries of these Comparative Examples were each prepared by repeating the same operations as in Example 1-1, except for not forming the polymeric support layer and changing the pouring amount so as to have the amount of electrolytic solution as shown in Table 2.

Comparative Example 2-4

A secondary battery of this Comparative Example was prepared by repeating the same operations as in Example 1-1, except for changing the pouring amount so as to have the amount of electrolytic solution as shown in Table 2 and not conducting heating after pouring the electrolytic solution.

Comparative Examples 2-5 and 2-6

Secondary batteries of these Comparative Examples were each prepared by repeating the same operations as in Example 1-1, except for changing the pouring amount so as to have the amount of electrolytic solution as shown in Table 2.

Comparative Examples 2-7 and 2-8

Secondary batteries of these Comparative Examples were each prepared by repeating the same operations as in Example 1-1, except for changing the cell volume as well as the pouring amount so as to have the amount of electrolytic solution as shown in Table 2.

<Initial Discharge Capacity and Capacity Retention Rate>

Each of the secondary batteries of Examples 1-1 and 2-1 to 2-3 and Comparative Examples 2-1 to 2-8 was subjected to constant-current constant-voltage charge at 23° C. and 200 mA for 7 hours until it reached an upper limit of 4.2 V and then subjected to constant-current discharge at 100 mA until it reached a final voltage of 2.5 V, thereby determining an initial discharge capacity.

Thereafter, each of the secondary batteries was subjected to 300 cycles of charge and discharge in such a manner that constant-current constant-voltage charge was carried out at 23° C. and 500 mA for 2 hours until it reached an upper limit of 4.2 V and that constant-current discharge was subsequently carried out at 500 mA until it reached a final voltage of 2.5 V. There was thus determined a capacity retention rate at the 300th cycle when a discharge capacity of the first cycle at the discharge at 500 mA was defined as 100%. The initial discharge capacity and the capacity retention rate at the 300th cycle are shown in Table 2.

<Measurement of Weight of Electrolytic Solution in Battery>

Each of the secondary batteries of Examples 1-1 and 2-1 to 2-3 and Comparative Examples 2-1 to 2-8 was measured for a weight of the electrolytic solution in the battery.

That is, with respect to each secondary battery, after measuring a weight of the battery, the battery element is taken out and then disassembled into the positive electrode, the negative electrode and the separator. Thereafter, the positive electrode, the negative electrode, the separator and the exterior member are immersed in a dimethyl carbonate solution for 2 days; and after filtration, vacuum drying is carried out for 3 days. The weight of the electrolytic solution was obtained by subtracting the weight after vacuum drying from the initial weight. The obtained results are shown in Table 2.

<Liquid Leakage Test>

The secondary batteries of Examples 1-1 and 2-1 to 2-3 and Comparative Examples 2-1 to 2-8 were each subjected to a liquid leakage test.

First of all, ten of each of the secondary batteries of Examples 1-1 and 2-1 to 2-3 and Comparative Examples 2-1 to 2-8 were prepared, and a hole having a diameter of 0.5 mm was bored on the exterior member 30A, followed by pressing under a pressure of 5 MPa. On that occasion, the number of batteries from which the electrolytic solution leaked was determined. The obtained results are shown in Table 2.

TABLE 2

|  | Presence or absence of polymeric support | Cell volume (cm3) | Amount of electrolytic solution (g) | Liquid amount per cm3 (g) | Initial discharge capacity (mAh) | Capacity retention rate (%) | Number of liquid leakage |
|---|---|---|---|---|---|---|---|
| Example 1-1 | Yes | 6.0 | 1.6 | 0.27 | 852 | 87 | 0/10 |
| Example 2-1 | Yes | 6.0 | 0.9 | 0.15 | 847 | 85 | 0/10 |
| Example 2-2 | Yes | 6.0 | 2.1 | 0.35 | 854 | 89 | 0/10 |
| Example 2-3 | Yes | 6.0 | 1.6 | 0.27 | 843 | 78 | 1/10 |
| Comparative Example 2-1 | No | 6.0 | 1.5 | 0.26 | 852 | 53 | 9/10 |

TABLE 2-continued

|  | Presence or absence of polymeric support | Cell volume (cm3) | Amount of electrolytic solution (g) | Liquid amount per cm3 (g) | Initial discharge capacity (mAh) | Capacity retention rate (%) | Number of liquid leakage |
|---|---|---|---|---|---|---|---|
| Comparative Example 2-2 | No | 6.0 | 2.2 | 0.37 | 849 | 69 | 10/10 |
| Comparative Example 2-3 | No | 6.0 | 2.7 | 0.45 | 849 | 81 | 10/10 |
| Comparative Example 2-4 | Yes | 6.0 | 2.3 | 0.38 | 844 | 82 | 10/10 |
| Comparative Example 2-5 | Yes | 6.0 | 0.8 | 0.13 | 852 | 64 | 0/10 |
| Comparative Example 2-6 | Yes | 6.0 | 2.2 | 0.37 | 851 | 84 | 5/10 |
| Comparative Example 2-7 | Yes | 9.0 | 1.2 | 0.13 | 1260 | 59 | 0/10 |
| Comparative Example 2-8 | Yes | 5.0 | 2.0 | 0.40 | 709 | 85 | 6/10 |

As shown in Table 2, in the secondary batteries of Examples 1-1 and 2-1 to 2-3, the cycle characteristic was excellent, and the liquid leakage was not confirmed or scarcely observed. On the other hand, in the secondary battery of Comparative Example 2-1, the cycle characteristic was poor, and the number of liquid leakage was large.

Also, in the batteries of Comparative Examples 2-5 and 2-7, the cycle characteristic was poor; and in the batteries of Comparative Examples 2-2, 2-3, 2-4, 2-6 and 2-8, the number of cells which caused liquid leakage was large. In the battery of Comparative Example 2-1, it may be thought that because of the matter that the polymeric support layer was not formed, the separator and the electrode did not come into close contact with each other; the electrolytic solution was not uniformly spread, whereby a portion where the electrolytic solution was excessively present and a portion where the electrolytic solution was short were generated; and therefore, the cycle characteristic was poor, and the number of cells which caused liquid leakage was large.

Also, in the batteries of Comparative Examples 2-2 and 2-3, though the polymeric support layer was not formed, the cycle characteristic was good because an excess of the electrolytic solution was added; however, it may be thought that the number of cells which caused liquid leakage was large because the excessive electrolytic solution was generated. Similarly, in the battery of Comparative Example 2-4, the electrode and the separator were not sufficiently adhered to each other because heating was not performed, and the cycle characteristic was good because an excess of the electrolytic solution was added; however, it may be thought that the number of cells which caused liquid leakage was large because the excessive electrolytic solution was generated.

Similarly, in the batteries of Comparative Examples 2-5 and 2-7, it may be thought that the cycle characteristic was lowered because the electrolytic solution was short; and in the batteries of Comparative Examples 2-6 and 2-8, it may be thought that the number of cells which caused liquid leakage was large because the excessive electrolytic solution was generated.

Also, in the battery of Example 2-3, a cell which caused liquid leakage was slightly confirmed. It may be thought that this was caused due to the matter that the electrode and the separator were not sufficiently adhered to each other because heating was not performed.

It was noted from the foregoing facts that when a prescribed polymeric support is arranged between the separator and the positive electrode and/or the negative electrode, and the amount of the non-aqueous electrolytic solution existing within the battery is from 0.14 g to 0.35 g per cm3 of the battery volume, the battery is excellent in cycle characteristic and has resistance to liquid leakage. Also, it was noted that what the polymeric support is adhered to the separator and at least one of the positive electrode and the negative electrode is more preferable.

As shown in Examples 1-1 and 2-1 to 2-3, in the non-aqueous electrolyte secondary battery provided with a polymeric support, when the amount of the non-aqueous electrolytic solution existing within the battery is from 0.14 g to 0.35 g per cm3 of the battery volume, prescribed initial charge-discharge capacity and capacity retention rate can be secured, and the liquid leakage can be suppressed.

In particular, in the non-aqueous electrolyte secondary battery in which the polymeric support is brought into close contact with or adhered to at least one of the separator, the positive electrode and the negative electrode, the liquid leakage can be surely avoided, and both the performance and the safety can be made compatible with each other within the range of the amount of the non-aqueous electrolytic solution at which the battery performance is most exhibited.

In the case where the polymeric support layer is not formed as shown in Comparative Examples 2-1 to 2-3, or in the case where the polymeric support is not brought into close contact without being heated as in Example 2-3 and Comparative Example 2-4, as the amount of the non-aqueous electrolytic solution per cm3 of the battery volume increases, the capacity retention rate is enhanced. However, as shown in Examples 1-1 and 2-1 to 2-2 and Comparative Examples 2-5 to 2-8, in the non-aqueous electrolyte battery with which the polymeric support layer is brought into close contact, even when the amount of the non-aqueous electrolytic solution per cm3 of the battery volume is increased to 0.37 g or 0.40 g, the capacity retention rate is not enhanced, and the initial discharge capacity is lowered. Also, the liquid leakage can be surely avoided in the range of the amount of the non-aqueous electrolytic solution where all of the initial discharge capacity and the capacity retention rate are favorable (from 0.14 g to 0.35 g per cm3).

In the light of the above, when the polymeric support is brought into close contact with or adhered to at least one of the separator, the positive electrode and the negative electrode, the battery performance is most exhibited by a small amount of the non-aqueous electrolytic solution. Also, the liquid leakage can be surely avoided, and both the performance and the safety can be made compatible with each other within the foregoing range.

In the foregoing embodiment, the case where the battery element 20 prepared by laminating and winding the positive electrode 21 and the negative electrode 22 is provided has been described. However, in the case where a tabular battery element in which a pair of a positive electrode and a negative electrode is laminated, or a laminate type battery element in which plural positive electrodes and negative electrodes are laminated is provided, the present invention can also be applied. Also, the present invention can be applied to not only a secondary battery but a primary battery.

Furthermore, as described previously, the present invention is concerned with a battery using lithium as an electrode reactant. However, the technical thought can also be applied to the case of using other alkali metal such as sodium (Na) and potassium (K), an alkaline earth metal such as magnesium (Mg) and calcium (Ca) or other light metal such as aluminum.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte secondary battery comprising:
   a positive electrode;
   a negative electrode;
   a separator disposed between the both electrodes;
   a non-aqueous electrolytic solution comprising an electrolyte salt in an amount of 13% by mass to 25% by mass; and
   an exterior member made of a laminate material and housing the positive electrode, the negative electrode, the separator and the non-aqueous electrolytic solution, wherein:
   a polymeric support exists between the separator and at least one of the positive electrode and the negative electrode;
   the separator is a film containing polyethylene and polypropylene;
   the amount of polypropylene in the separator is greater than 0% by mass and less than or equal to 10% by mass;
   the separator has a uniform thickness of from 5 to 20 μm; and
   the battery has a maximum attained temperature not higher than 100° C. using a nail piercing safety test at the time of conducting the safety test.

2. The non-aqueous electrolyte secondary battery according to claim 1, wherein the non-aqueous electrolytic solution existing in the non-aqueous electrolyte secondary battery is from 0.14 to 0.35 g per $cm^3$ of the volume of the non-aqueous electrolyte secondary battery.

3. The non-aqueous electrolyte secondary battery according to claim 1, wherein the polymeric support comes into close contact with or adheres to the separator and at least one of the positive electrode and the negative electrode.

4. The non-aqueous electrolyte secondary battery according to claim 1, wherein the polymeric support contains a polymer containing vinylidene fluoride as a constitutional component.

5. The non-aqueous electrolyte secondary battery according to claim 1, wherein the non-aqueous electrolytic solution contains a halogen atom-containing cyclic carbonic ester derivative.

6. The non-aqueous electrolyte secondary battery according to claim 5, wherein the cyclic carbonic ester contains at least one of 4-fluoro-1,3-dioxolan-2-one and 4-chloro-1,3-dioxolan-2-one.

7. The non-aqueous electrolyte secondary battery according to claim 1, wherein the laminate material constituting the exterior member is composed of aluminum and a resin.

8. The non-aqueous electrolyte secondary battery according to claim 1, wherein the amount of polypropylene in the separator is between 0.5% by mass and 10% by mass.

9. The non-aqueous electrolyte secondary battery according to claim 1, wherein the separator is a single film.

10. The non-aqueous electrolyte secondary battery according to claim 1, wherein the polyethylene has a melting point of 130° C. to 140° C., and the polypropylene has a melting point of 160° C. to 170° C.

11. The non-aqueous electrolyte secondary battery according to claim 1, wherein a difference in melting points between the polyethylene and the polypropylene is 20° C. or more.

12. The non-aqueous electrolyte secondary battery according to claim 1, wherein the amount of polypropylene in the separator is between 0.5% by mass and 5% by mass.

13. The non-aqueous electrolyte secondary battery according to claim 1, wherein one of the positive electrode and the negative electrode is adhered to the separator, and a peel strength between the separator and an exposed portion of the positive electrode or the negative electrode is 5 mN/mm or more.

14. The non-aqueous electrolyte secondary battery according to claim 1, wherein the non-aqueous electrolytic solution contains from 20% to 50% by mass of a cyclic carbonate and from 50% to 80% by mass of a solvent selected from the group consisting of: diethyl carbonate, dimethyl carbonate, ethyl methyl carbonate, methyl propyl carbonate, methyl acetate, ethyl acetate, methyl propionate, ethyl propionate, methyl butyrate, methyl isobutyrate, methyl trimethylacetate, ethyl trimethylacetate, N,N-dimethylacetamide, methyl N,N-diethylcarbamate, ethyl N,N-diethylcarbamate, 1,2-dimethoxyethane, tetrahydrofuran, tetrahydropyran and 1,3-dioxolane.

15. The non-aqueous electrolyte secondary battery according to claim 1, wherein the amount of polypropylene in the separator is between 1% by mass and 8% by mass.

* * * * *